(12) United States Patent
Hu et al.

(10) Patent No.: US 12,170,888 B2
(45) Date of Patent: Dec. 17, 2024

(54) CELL HANDOVER METHOD, COMMUNICATION APPARATUS, AND SYSTEM

(71) Applicant: Huawei Technologies Co., Ltd., Shenzhen (CN)

(72) Inventors: Li Hu, Shanghai (CN); Yinghao Jin, Boulogne Billancourt (FR); Rui Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 424 days.

(21) Appl. No.: 17/548,251

(22) Filed: Dec. 10, 2021

(65) Prior Publication Data

US 2022/0104097 A1 Mar. 31, 2022

Related U.S. Application Data

(63) Continuation of application No. PCT/CN2020/095983, filed on Jun. 12, 2020.

(30) Foreign Application Priority Data

Jun. 14, 2019 (CN) .......................... 201910518171.6

(51) Int. Cl.
*H04W 36/00* (2009.01)
*H04W 36/30* (2009.01)
*H04W 36/36* (2009.01)

(52) U.S. Cl.
CPC ..... *H04W 36/0085* (2018.08); *H04W 36/302* (2023.05); *H04W 36/362* (2023.05)

(58) Field of Classification Search
None
See application file for complete search history.

(56) References Cited

U.S. PATENT DOCUMENTS

| 2007/0291712 A1 | 12/2007 | Mao et al. |
| 2014/0126545 A1 | 5/2014 | Tamura et al. |

(Continued)

FOREIGN PATENT DOCUMENTS

| CN | 102740381 A | 10/2012 |
| CN | 102740385 A | 10/2012 |

(Continued)

OTHER PUBLICATIONS

Huawei, Hisilicon, "Solution #6: Resolve EN signaling details of how the UE hands over to FBS", 3GPP TSG SA WG3 (Security) Meeting #95, S3-191235, May 6-10, 2019, 5 pages, Reno, Nevada (US).

(Continued)

*Primary Examiner* — Anh Ngoc M Nguyen
(74) *Attorney, Agent, or Firm* — Slater Matsil, LLP

(57) ABSTRACT

When triggering a handover request, a source network device requests a measurement indication from a target access network device using the handover request, where the measurement indication indicates the terminal device to measure a channel state of a target cell. In this way, the source network device sends the measurement indication to the terminal device using an RRC reconfiguration message. Then, the terminal device measures the specified channel state of the target cell based on the measurement indication, to obtain a measurement result, and then determines, depending on whether the measurement result meets a handover condition, whether to perform cell handover.

20 Claims, 7 Drawing Sheets

(56) References Cited

U.S. PATENT DOCUMENTS

| | | |
|---|---|---|
| 2019/0174362 A1 | 6/2019 | Yang et al. |
| 2020/0187069 A1 | 6/2020 | Hong et al. |
| 2021/0051537 A1* | 2/2021 | Zhang .................. H04W 36/36 |
| 2022/0053385 A1* | 2/2022 | Li ..................... H04W 36/0069 |
| 2022/0132592 A1* | 4/2022 | Lee .................... H04W 72/542 |

FOREIGN PATENT DOCUMENTS

| | | |
|---|---|---|
| CN | 103518399 A | 1/2014 |
| CN | 103945467 A | 7/2014 |
| CN | 107071842 A | 8/2017 |
| CN | 108093404 A | 5/2018 |
| CN | 108271228 A | 7/2018 |
| CN | 108616939 A | 10/2018 |
| CN | 108810960 A | 11/2018 |
| CN | 109068330 A | 12/2018 |
| CN | 109587686 A | 4/2019 |
| EP | 3609231 A1 | 2/2020 |
| KR | 20180118047 A | 10/2018 |
| KR | 20180122963 A | 11/2018 |

OTHER PUBLICATIONS

Huawei, Hisilicon, "Solution #6: Resolve EN Handover Attemp Failure Counter", 3GPP TSG SA WG3 (Security) Meeting #95, S3-191236, May 6-10, 2019, 4 pages, Reno (US).

"Solution for Avoiding UE Connecting to False Base Station During Conditional Handover," Source: Huawei, Hisilicon, Document for: Approval, Agenda Item: 5.5, 3GPP TSG SA WG3 Meeting #96-Adhoc, S3-193760 (revision of S3-193491), XP051799292, Oct. 14-18, 2019, 3 pages.

"Aoviding HO Caused by Fake Base Station," Source: Huawei, Hisilicon, Document for: Approval, Agenda Item: 8.9, 3GPP TSG SA WG3 (Security) Meeting #93, S3-183351 (revision of S3-18xabc), XP051564605, Nov. 12-16, 2018, 4 pages.

* cited by examiner

CELL HANDOVER METHOD, COMMUNICATION APPARATUS, AND SYSTEM

CROSS-REFERENCE TO RELATED APPLICATIONS

This application is a continuation of International Application No. PCT/CN2020/095983, filed on Jun. 12, 2020, which claims priority to Chinese Patent Application No. 201910518171.6, filed on Jun. 14, 2019. The disclosures of the aforementioned applications are hereby incorporated by reference in their entireties.

TECHNICAL FIELD

Embodiments of this application relate to the field of communication technologies, and in particular, to a cell handover method and a communication apparatus and system.

BACKGROUND

In a mobile network, an attacker deploys a false access network device, and consequently, a terminal device is attracted and camps on the false access network device. In a manner, the false access network device masquerades as a cell of a genuine base station near the terminal device. When the terminal device is in a connected state, the terminal device measures a surrounding cell, and reports a measurement report to a source network device on which the terminal device camps. However, the measurement report may include a signal of a cell of the false access network device. Because the false access network device is relatively close to the terminal device, resulting in relatively good signal quality, a handover condition for controlling handover of the terminal device by the source network device may be met. The source network device controls the terminal device to be handed over to the false access network device. Consequently, the terminal device camps on the false access network device. Once the terminal device camps on the false access network device, the false access network device may initiate a denial of service (DoS) attack on the terminal device, or even sniff, tamper with, or forge content of communication between the terminal device and the network.

How to prevent the terminal device from being handed over to the false access network device needs to be studied.

SUMMARY

Embodiments of this application provide a cell handover method and a communication apparatus and system, to resolve a problem of how to prevent a terminal device from being handed over to a false access network device.

According to a first aspect, an embodiment of this application provides a cell handover method. The method includes: A terminal device receives a radio resource control (RRC) reconfiguration message sent by a source access network device, where the RRC reconfiguration message carries a measurement indication and a handover condition. Then, the terminal device measures a specified channel state of a target cell based on the measurement indication, to obtain first signal quality of the target cell. Then, the terminal device determines, based on the first signal quality of the target cell and the handover condition, whether to perform a handover procedure.

Because integrity protection is performed on the RRC reconfiguration message sent by the source access network device to the terminal device, the false access network device cannot tamper with the RRC reconfiguration message. In other words, the false access network device cannot tamper with the measurement indication and the handover condition in the RRC reconfiguration message. Because the measurement indication is sent by a genuine access network device and is used to indicate the terminal device to measure the specified channel state of the target cell, when the false access network device and the genuine access network device are located at different locations, the terminal device may measure signal quality of a target cell of the genuine access network device. Therefore, the terminal device determines, based on the measured signal quality of the target cell of the genuine access network device, whether to perform handover, to prevent the terminal device from being handed over to the false access network device. In addition, both signal measurement and handover determining are performed by a terminal device side. Therefore, the terminal device does not need to report a secondary measurement result by using signaling, thereby reducing a handover delay of terminal handover caused by the secondary measurement.

In a possible design, that the terminal device determines, based on the first signal quality of the target cell and the handover condition, whether to perform a handover procedure includes: The terminal device determines whether the first signal quality of the target cell meets the handover condition. If the handover condition is met, the terminal device sends an RRC reconfiguration complete message to the target cell; or if the handover condition is not met, the terminal device skips performing the handover procedure.

In a possible design, before the terminal device receives the RRC reconfiguration message sent by the source access network device, the method further includes: The terminal device sends a measurement report to the source access network device, where the measurement report includes second signal quality of the target cell obtained through measurement performed by the terminal device on the target cell.

According to the foregoing design, after the terminal device sends the measurement report for first measurement, when the second signal quality is sufficiently strong (signal strength is greater than a preset threshold, and a terminal needs to be handed over from a cell on which the terminal currently camps to the target cell), the terminal device is not directly handed over to the target cell as in a conventional technology. Because second signal strength measured by the terminal may be signal quality of a target cell forged by the false access network device. In this embodiment of this application, the terminal performs secondary measurement on the signal of the target cell of the genuine access network device based on the measurement indication, and determines, based on a result of the secondary measurement, whether to be handed over to the target cell. In this way, the terminal device is not handed over to the false access network device.

In a possible design, when the terminal device determines that the false access network device is suspected to exist, the measurement report further includes a first indication, where the first indication is used to indicate, to the source access network device, that the target cell is suspicious.

In the foregoing manner, the terminal device reports the first indication to the source access network device when determining that the false access network device is suspected to exist, to indicate the source access network device to request, from the target access network device, the measurement indication for secondary measurement. When determining that the false access network device does not exist, the terminal device does not need to report the first indication to the source access network device. Therefore, the terminal device does not need to perform secondary measurement. This can avoid secondary measurement as much as possible, thereby ensuring a speed of cell handover of the terminal device while reducing signaling overheads of the terminal device and a network side.

In a possible design, the method further includes: The terminal device measures the target cell, to obtain the second signal quality and third signal quality of the target cell. When a difference between the second signal quality and the third signal quality is greater than a first threshold, the terminal device determines that the false access network device is suspected to exist.

It should be noted that, in this embodiment of this application, "that the false access network device is suspected to exist" means that a probability that the false access network device exists is greater than a preset value. For example, in this embodiment of this application, a probability that a false base station exists may be determined based on the difference between the second signal quality and the third signal quality. A larger difference indicates a larger probability that the false access network device exists. When the difference is greater than the first threshold, the terminal device determines that the false access network device is suspected to exist. The preset value used to determine that the false access network device is suspected to exist may be specifically set by an operator or a device manufacturer, and a specific value may be set based on a layout environment and a security requirement of an access device. For example, in an environment having a higher security requirement, the preset value may be set to a smaller value.

The foregoing design provides a simple and easy-to-implement manner of determining that the false access network device is suspected to exist.

In a possible design, the measurement indication includes one or both of the following information: a synchronization signal block (SSB) or a channel state information-reference signal (CSI-RS).

In a possible design, the handover condition includes a first event or a second event, where the first event is that signal quality of the target cell is higher than signal quality of a serving cell on which the terminal device currently camps; and the second event is that the signal quality of the serving cell on which the terminal device currently camps is less than a handover threshold and the signal quality of the target cell is greater than the handover threshold.

According to a second aspect, an embodiment of this application provides a cell handover method. The method includes: A source access network device receives a measurement report sent by a terminal device, where the measurement report includes second signal quality of a target cell of a target access network device. Then, the source access network device sends a handover request to the target access network device when determining, based on the second signal quality of the target cell, that the terminal device needs to be handed over to the target cell. Then, the source access network device receives a handover request acknowledgement from the target access network device, where the handover request acknowledgement includes a measurement indication, and the measurement indication is used to indicate the terminal device to measure a channel state of the target cell. The source access network device sends a radio resource control (RRC) reconfiguration message to the terminal device, where the RRC reconfiguration message carries the measurement indication and a handover condition, and the handover condition is obtained by the source access network device and is used to indicate a condition that needs to be met when the terminal device performs cell handover.

Because integrity protection is performed on the RRC reconfiguration message sent by the source access network device to the terminal device, the false access network device cannot tamper with the RRC reconfiguration message. In other words, the false access network device cannot tamper with the measurement indication and the handover condition in the RRC reconfiguration message. Because the measurement indication is sent by a genuine access network device and is used to indicate the terminal device to measure the specified channel state of the target cell, when the false access network device and the genuine access network device are located at different locations, the terminal device may measure signal quality of a target cell of the genuine access network device. Therefore, the terminal device determines, based on the measured signal quality of the target cell of the genuine access network device, whether to perform handover, to prevent the terminal device from being handed over to the false access network device.

In a possible design, the handover request carries a measurement request indication, and the measurement request indication is used to request the measurement indication from the target access network device.

In a possible design, the source access network device includes the measurement request indication in the handover request when determining that the false access network device is suspected to exist.

In the foregoing manner, the source access network device requests, from the target access network device, the measurement indication for secondary measurement when determining that the false access network device is suspected to exist. When determining that the false access network device does not exist, the source access network device does not need to request the measurement indication from the target access network device. Therefore, the terminal device does not need to perform secondary measurement. This can avoid secondary measurement as much as possible, thereby ensuring a speed of cell handover of the terminal device while reducing signaling overheads of the terminal device and a network side.

In a possible design, the measurement report includes the second signal quality of the target cell and third signal quality of the target cell that are measured within preset duration; and the determining that the false access network device is suspected to exist includes: when a difference between the second signal quality of the target cell and the third signal quality of the target cell is greater than a first threshold, determining that the false access network device is suspected to exist.

The foregoing design provides a simple and easy-to-implement manner in which the source access network device determines that the false access network device is suspected to exist.

In a possible design, the measurement report further carries a first indication, and the first indication is used to indicate that the target cell is suspicious. The source access network device includes the measurement request indication in the handover request based on the first indication. In other words, the source access network device may determine, based on the first indication sent by the terminal device, that the terminal device needs to perform secondary measurement on the signal quality of the target cell, and then request the measurement indication from the target access network device corresponding to the target cell.

In a possible design, before the source access network device sends the RRC reconfiguration message to the terminal device, the method further includes: The source access network device generates the handover condition based on a handover condition parameter, where the handover condition parameter is a parameter in local configuration information of the source access network device, or the handover condition parameter is sent by the target access network device.

The foregoing design provides a simple and effective manner in which the source access network device obtains the handover condition.

In a possible design, the handover request carries a handover condition parameter in local configuration information of the source access network device, and the handover condition parameter is used to generate the handover condition. The handover request acknowledgement further carries the handover condition.

The foregoing design provides a simple and effective manner in which the source access network device obtains the handover condition.

In a possible design, the measurement indication includes one or both of the following information: a synchronization signal block (SSB) or a channel state information-reference signal (CSI-RS).

In a possible design, the handover condition includes a first event or a second event, where the first event is that signal quality of the target cell is higher than signal quality of a serving cell on which the terminal device currently camps; and the second event is that the signal quality of the serving cell on which the terminal device currently camps is less than a first handover threshold and the signal quality of the target cell is greater than the first handover threshold.

In a possible design, that the source access network device determines, based on the second signal quality of the target cell, that the terminal device needs to be handed over to the target cell includes: determining that the second signal quality of the target cell is greater than a second handover threshold, or determining that the second signal quality of the target cell is less than the second handover threshold but greater than a third handover threshold, where the second handover threshold may be a handover threshold for triggering sending of the handover request; and the third handover threshold may be a handover threshold for triggering a conditional handover request.

According to a third aspect, an embodiment of this application further provides a communication apparatus. The communication apparatus is used in a terminal device or a chip in the terminal device. For beneficial effects, refer to the descriptions in the first aspect. Details are not described herein again. The apparatus has a function of implementing behavior in the method example in the first aspect. The function may be implemented by hardware, or may be implemented by hardware executing corresponding software. The hardware or the software includes one or more modules corresponding to the foregoing function. In a possible design, a structure of the apparatus includes a receiving unit, a processing unit, and a sending unit. These units may perform corresponding functions in the method example in the first aspect. For details, refer to the detailed descriptions in the method example. Details are not described herein again.

According to a fourth aspect, an embodiment of this application further provides a communication apparatus. The communication apparatus is used in a source access network device or a chip in the source access network device. For beneficial effects, refer to the descriptions in the second aspect. Details are not described herein again. The apparatus has a function of implementing the behavior in the method example in the second aspect. The function may be implemented by hardware, or may be implemented by hardware executing corresponding software. The hardware or the software includes one or more modules corresponding to the foregoing function. In a possible design, a structure of the apparatus includes a receiving unit, a processing unit, and a sending unit. These units may perform corresponding functions in the method example in the second aspect. For details, refer to the detailed descriptions in the method example. Details are not described herein again.

According to a fifth aspect, an embodiment of this application further provides a communication apparatus. The communication apparatus is used in a terminal device or a chip in the terminal device. For beneficial effects, refer to the descriptions in the first aspect. Details are not described herein again. A structure of the communication apparatus includes a processor and a memory. The processor is configured to support the terminal device in performing a corresponding function in the method in the first aspect. The memory is coupled to the processor, and stores program instructions and data that are necessary for the communication apparatus. The structure of the communication apparatus further includes a communication interface, configured to communicate with another device.

According to a sixth aspect, an embodiment of this application further provides a communication apparatus. The communication apparatus is used in a source access network device or a chip in the source access network device. For beneficial effects, refer to the descriptions in the second aspect. Details are not described herein again. A structure of the communication apparatus includes a processor and a memory. The processor is configured to support the source access network device in performing a corresponding function in the method in the second aspect. The memory is coupled to the processor, and stores program instructions and data that are necessary for the communication apparatus. The structure of the communication apparatus further includes a communication interface, configured to communicate with another device.

According to a seventh aspect, an embodiment of this application further provides a communication system. The communication system includes: a source access network device, configured to: receive a measurement report sent by a terminal device, where the measurement report includes second signal quality of a target cell of a target access network device; and send a handover request to the target access network device when determining, based on the second signal quality of the target cell, that the terminal device needs to be handed over to the target cell; and a target access network device, configured to: receive the handover request sent by the source network device, and send a handover request acknowledgement to the source access network device, where the handover request acknowledgement includes a measurement indication, and the measurement indication is used to indicate the terminal device to measure a channel state of the target cell, where the source access network device is further configured to: receive the handover request acknowledgement from the target access network device, and send a radio resource control (RRC) reconfiguration message to the terminal device, where the RRC reconfiguration message carries the measurement indication and a handover condition, and the handover condition is used to indicate a condition that needs to be met when the terminal device performs cell handover.

In a possible design, the handover request carries a measurement request indication, and the measurement request indication is used to request the measurement indication from the target access network device.

In a possible design, the source access network device is further configured to include the measurement request indication in the handover request when determining that a false access network device is suspected to exist.

In a possible design, the measurement report includes the second signal quality of the target cell and third signal quality of the target cell that are measured within preset duration. The source access network device is specifically configured to: when a difference between the second signal quality of the target cell and the third signal quality of the target cell is greater than a first threshold, determine that the false access network device is suspected to exist.

In a possible design, the measurement report carries a first indication, and the first indication is used to indicate that the target cell is suspicious. The source access network device is specifically configured to include the measurement request indication in the handover request based on the first indication.

In a possible design, the source access network device is further configured to: before sending the RRC reconfiguration message to the terminal device, generate the handover condition based on a handover condition parameter, where the handover condition parameter is a parameter in local configuration information of the source access network device, or the handover condition parameter is sent by the target access network device.

In a possible design, the handover request carries a handover condition parameter in local configuration information of the source access network device. The target access network device is further configured to: generate the handover condition based on the handover condition parameter, and include the handover condition in the handover request acknowledgement.

In a possible design, the measurement indication includes one or both of the following information: a synchronization signal block (SSB) or a channel state information-reference signal (CSI-RS).

In a possible design, the handover condition includes a first event or a second event, where the first event is that signal quality of the target cell is higher than signal quality of a serving cell on which the terminal device currently camps; and the second event is that the signal quality of the serving cell on which the terminal device currently camps is less than a first handover threshold and the signal quality of the target cell is greater than the first handover threshold.

In a possible design, the source access network device is specifically configured to send the handover request to the target access network device when determining that the second signal quality of the target cell is greater than a second handover threshold, or determining that the second signal quality of the target cell is less than the second handover threshold but greater than a third handover threshold.

In a possible design, the communication system further includes the terminal device. The terminal device is configured to: send the measurement report to the source network device; receive the RRC reconfiguration message sent by the source access network device; measure the channel state of the target cell based on the measurement indication in the RRC reconfiguration message, to obtain first signal quality of the target cell; and determine, based on the first signal quality of the target cell and the handover condition, whether to perform a cell handover procedure.

In a possible design, the terminal device is specifically configured to: determine whether the first signal quality of the target cell meets the handover condition; and if the handover condition is met, send an RRC reconfiguration complete message to the target cell; or if the handover condition is met, skip performing the handover procedure.

In a possible design, the terminal device is further configured to: before receiving the RRC reconfiguration message sent by the source access network device, send the measurement report to the source access network device, where the measurement report includes the second signal quality of the target cell obtained through measurement performed by the terminal device on the target cell.

In a possible design, the terminal device is further configured to: when determining that the false access network device is suspected to exist, include the first indication in the measurement report, where the first indication is used to indicate, to the source access network device, that the target cell is suspicious.

In a possible design, the terminal device is specifically configured to: measure the target cell, to obtain the second signal quality and the third signal quality of the target cell; and when the difference between the second signal quality and the third signal quality is greater than the first threshold, determine that the false access network device is suspected to exist.

According to an eighth aspect, this application further provides a computer-readable storage medium. The computer-readable storage medium stores instructions. When the instructions are run on a computer, the computer is enabled to perform the methods according to the foregoing aspects.

According to a ninth aspect, this application further provides a computer program product including instructions. When the computer program product runs on a computer, the computer is enabled to perform the methods according to the foregoing aspects.

According to a tenth aspect, this application further provides a chip. The chip is connected to a memory. The chip is configured to read and execute a software program stored in the memory, to perform the methods according to the foregoing aspects.

DETAILED DESCRIPTION OF ILLUSTRATIVE EMBODIMENTS

Figure 1:
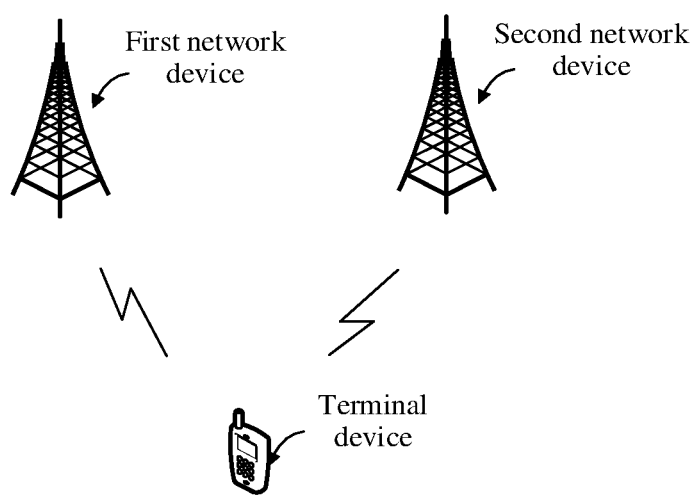
FIG. 1 is a schematic diagram of an architecture of a 5G network system according to an embodiment of this application.

It should be understood that "an embodiment," "an implementation," or "an example" mentioned in the entire specification means that particular features, structures, or characteristics related to embodiments are included in at least one embodiment of this application. Therefore, "in an embodiment", "in an implementation", "in an implementation", or "in an example" appearing throughout the entire specification does not necessarily refer to a same embodiment. In addition, these particular features, structures, or characteristics may be combined in one or more embodiments in any proper manner. It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification usually indicates an "or" relationship between the associated objects. In this application, the term "at least one" means one or more, that is, including one, two, three, or more; and "a plurality of" means two or more, that is, including two, three, or more. "At least one of the following items (pieces)" or a similar expression thereof indicates any combination of these items, including a single item (piece) or any combination of a plurality of items (pieces). For example, at least one item (piece) of a, b, or c may indicate a, b, c, a and b, a and c, b and c, or a, b, and c, where a, b, and c may be singular or plural. It should be understood that, in the embodiments of this application, "B corresponding to A" indicates that B is associated with A, and B may be determined according to A. However, it should further be understood that determining B according to A does not mean that B is determined according to A only; that is, B may be further determined according to A and/or other information. In addition, unless otherwise stated, ordinal numbers such as "first" and "second" in the embodiments of this application are used to distinguish between a plurality of objects, and are not intended to limit an order, a time sequence, priorities, or importance of the plurality of objects. In addition, the terms "include" and "have" in the embodiments, claims, and accompanying drawings of this application are not exclusive. For example, a process, method, system, product, or device including a series of steps or modules is not limited to the enumerated steps or modules, and may further include a step or module that is not enumerated.

The embodiments of this application may be applied to a network architecture of a 4th generation mobile communication technology (4G), a network architecture of a 5th generation mobile communication technology (5G); a network architecture of a future 6th generation mobile communication technology; or the like.

FIG. 1 shows a network system. The network system includes a first access network device, a second access network device, and a terminal device. FIG. 1 is merely an example, and does not constitute a limitation on a quantity of access network devices and a quantity of terminal devices included in the network system. The first access network device and the second access network device may communicate with each other by using a wired connection, for example, communicate with each other through an X2 interface or an Xn interface, or may communicate with each other through an air interface. FIG. 1 is merely a schematic diagram. The network system may further include another network device, for example, may further include a core network device, a wireless relay device, and a wireless backhaul device, which are not shown in FIG. 1. The access network device may provide a wireless access-related service for the terminal device, to implement one or more of the following functions: a wireless physical layer function, a resource scheduling and radio resource management function, a quality of service (QoS) management function, a wireless access control function, and a mobility management function. The terminal device may communicate with the access network device through an air interface.

The access network device is an access device through which the terminal device accesses the network system in a wireless manner, and may be a base station, an evolved NodeB (eNodeB), a transmission reception point (TRP), a next generation NodeB (gNB) in a 5G mobile communication system, a base station in a future mobile communication system, an access node in a Wi-Fi system, or the like; or may be a module or a unit that completes a part of a function of a base station, for example, may be a central unit (CU) or a distributed unit (DU). A specific technology and a specific device form used for the access network device are not limited in the embodiments of this application.

The terminal device may also be referred to as a terminal, user equipment (UE), a mobile station (MS), a mobile terminal (MT), or the like. The terminal device may be a mobile phone, a tablet computer, a computer having a wireless transceiver function, a virtual reality (VR) terminal device, an augmented reality (AR) terminal device, a wireless terminal in industrial control, a wireless terminal in self-driving, a wireless terminal in a remote medical surgery, a wireless terminal in a smart grid, a wireless terminal in transportation safety, a wireless terminal in a smart city, a wireless terminal in a smart home, or the like. A specific technology and a specific device form used for the terminal device are not limited in the embodiments of this application.

The access network device and the terminal device may be deployed on land, including an indoor or outdoor device, a hand-held device, or a vehicle-mounted device; or may be deployed on water; or may be deployed in an airplane, a balloon, or a satellite in the air. Application scenarios of the access network device and the terminal device are not limited in the embodiments of this application.

The access network device and the terminal device may communicate with each other by using a licensed spectrum, or may communicate with each other by using an unlicensed spectrum, or may communicate with each other by using both a licensed spectrum and an unlicensed spectrum. The access network device and the terminal device may communicate with each other by using a spectrum below 6 gigahertz (GHz), or may communicate with each other by using a spectrum above 6 GHz, or may communicate with each other by using both a spectrum below 6 GHz and a spectrum above 6 GHz. A spectrum resource used between the access network device and the terminal device is not limited in the embodiments of this application.

The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of a network architecture and emergence of a new service scenario, the technical solutions provided in the embodiments of this application are also applicable to similar technical problems.

Usually, there may be a plurality of access network devices near the terminal device. The terminal device may select a cell as a serving cell based on quality of service (for example, signal quality) of cells of the access network devices, and the cells of different access network devices may have different quality of service. The terminal device needs to camp on a cell having relatively good quality of service. If the terminal device camps on cell 1 managed by the first access network device, cell 1 is the serving cell of the terminal device. Cell 2 managed by the second access network device is adjacent to cell 1, that is, is a neighboring cell of cell 1.

Figure 2:
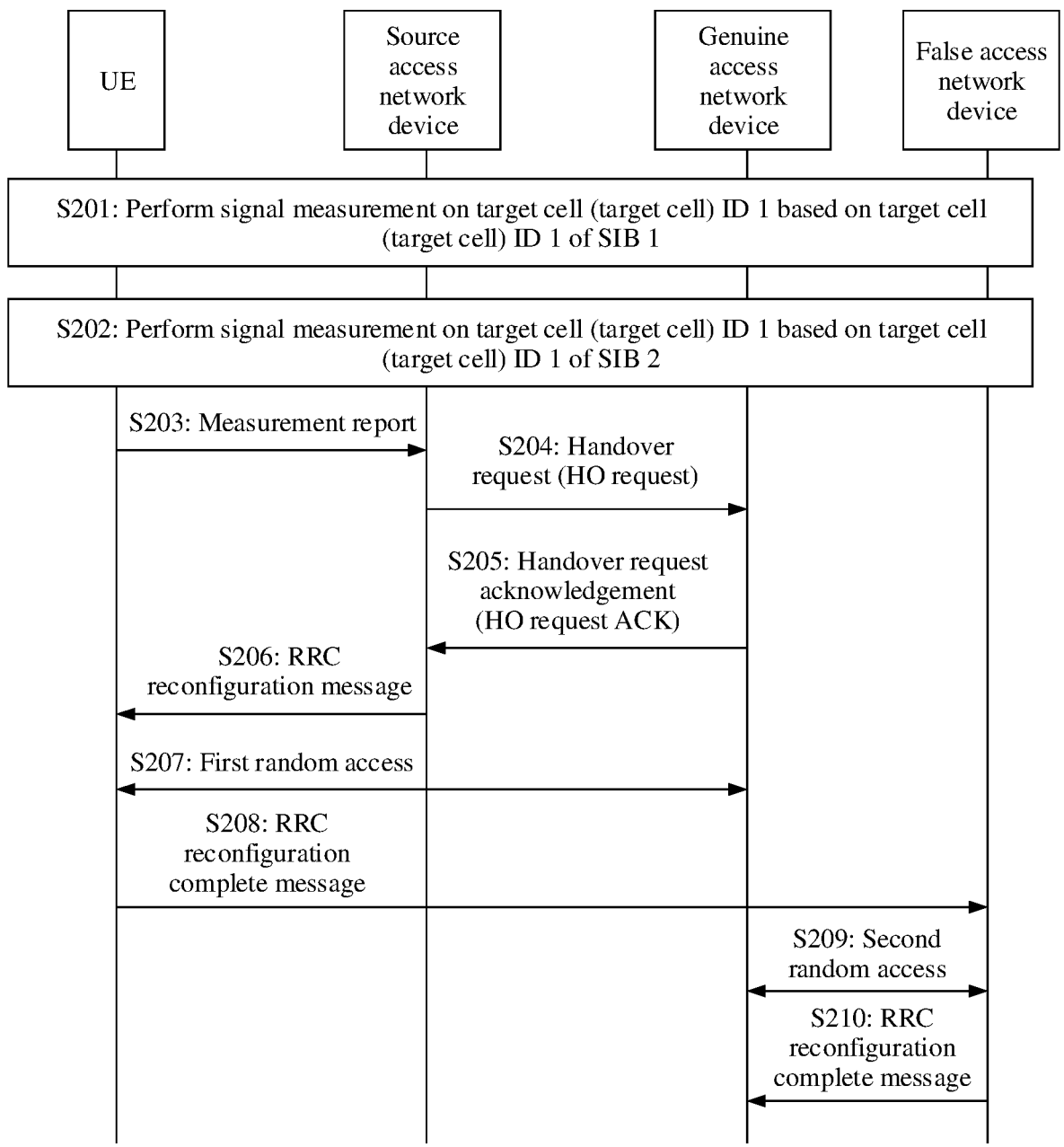
FIG. 2 is a schematic flowchart of cell handover according to an embodiment of this application.

Before a cell handover solution provided in the embodiments of this application is described, a procedure in which the terminal device in a connected state may be handed over to a false access network device and a procedure in which the terminal device performs secondary measurement are described. In this application, an access network device currently connected to the terminal device is a source access network device, an access network device to which the terminal device needs to be handed over is a target access network device, a cell that serves the terminal device and that is managed by the source access network device is a serving cell, and a cell managed by the target access network device is a target cell. FIG. 2 is a schematic flowchart in which a terminal device in a connected state may be handed over to a false access network device.

An attacker forges a cell identifier (ID), for example, target cell ID 1, of a surrounding genuine access network device through the false access network device. The genuine access network device and the false access network device both broadcast, to the terminal device by using a system information block (SIB), cell IDs of cells managed by the genuine access network device and the false access network device. Therefore, the terminal device may receive two broadcast messages: SIB 1 from the genuine access network device and SIB 2 from the false access network device, and both SIB 1 and SIB 2 carry target cell ID 1.

S201: The terminal device performs signal measurement on target cell ID 1 based on target cell ID 1 of SIB 1, which is essentially measuring a cell of the genuine access network device, to obtain signal quality, namely, signal 1, of the cell of the genuine access network device.

S202: The terminal device performs signal measurement on target cell ID 1 based on target cell ID 1 of SIB 2, which is essentially measuring a cell forged by the false access network device, to obtain signal quality, namely, signal 2, of the cell of the false access network device.

It should be understood that, because the false access network device expects the terminal device to camp on the false access network device, a distance between the false access network device and the terminal device is shorter than a distance between the genuine access network device and the terminal device. Consequently, the signal quality of signal 2 measured by the terminal device is higher than the signal quality of signal 1, which may trigger handover of the terminal device to the false access network device.

S203: When a reporting condition is met, the terminal device reports a measurement report to a source access network device.

Measurement reporting events may include events A1 to A5 and events B1 and B2. In this case, that a reporting condition is met may be that at least one of the events A1 to A5 and the events B1 and B2 is met.

For example, the terminal device may report the measurement report in one of the following two implementations.

First implementation: The terminal device reports, in a same measurement report, a signal quality of target cell ID 1 measured last time. Assuming that a signal of the cell of the false access network device is measured last time, the measurement report is {target cell ID 1: signal 2}.

Second implementation: The terminal device reports, in a same measurement report, signals of target cell ID 1 measured for a plurality of times, for example, {target cell ID 1: signal 1, target cell ID 1: signal 2}.

The signal quality of signal 2 may be higher than the signal quality of signal 1, and the signal quality of signal 2 may trigger a handover threshold of the source access network device. In this case, the source access network device finds the genuine access network device based on target cell ID 1, and initiates handover preparation.

S204: When determining, based on the measurement report, that signal quality of a target cell reaches a second handover threshold, the source access network device initiates a handover request (HO request) message to the genuine access network device, where the second handover threshold is a threshold used by the source network device to trigger a handover request message.

It should be noted that, when the source access network device determines whether to trigger the handover request message, with reference to the measurement report, the source access network device may determine, based on a load status of the source access network device, quality of service of a service of the terminal device, and the like, whether to initiate the handover request message. After determining that the terminal device needs to be handed over to another cell, the source access network device may select the target cell for the terminal device based on the measurement report. For example, the measurement report may indicate signal quality of neighboring cells measured by a plurality of terminal devices. The source access network device may select, based on the measurement report, a neighboring cell having strongest signal quality in cells of which signal quality reaches the handover threshold as the target cell.

For example, the signal quality of the target cell may be a reference signal received power (RSRP) or reference signal received quality (RSRQ) of the target cell. The foregoing signal quality of the cell is used as an example. Actually, the terminal device may alternatively reflect the signal quality of the cell by using another attribute of a cell signal. This is not limited in this embodiment of this application.

S205: After receiving the handover request, the target access network device prepares handover configuration information (namely, a context) that enables successful handover of the terminal device, and sends a handover request acknowledgement (HO request ACK) message to the source access network device.

S206: After receiving the handover request acknowledgement message, the source access network device sends a radio resource control (RRC) reconfiguration message to the terminal device, where the RRC reconfiguration message indicates the terminal device to be handed over from the source access network device to the target access network device, and the RRC reconfiguration message may include a configuration parameter of the target cell, for example, a target cell ID, namely, target cell ID 1, or a frequency of the target cell.

S207: The terminal device initiates first random access to the target access network device based on the configuration parameter of the target cell in the RRC reconfiguration message, to request to access the target cell, thereby establishing a lower-layer link. In this case, because the false access network device forges the target cell ID, the terminal device may randomly access the false access network device.

S208: The terminal device sends an RRC reconfiguration complete message to the false access network device. In this case, the terminal device has camped on the false access network device, and has been capable of sending data. However, because the false access network device cannot access a network, the false access network device cannot forward data to the terminal device. Consequently, a denial of service attack may occur on the terminal device.

Optionally, S209: The false access network device may initiate second random access to a target cell of the genuine access network device, to request to access the target cell.

S210: When receiving the RRC reconfiguration complete message sent by the terminal device, the false access network device may forward the RRC reconfiguration complete message to the genuine access network device. Because encryption and integrity protection is performed on the RRC reconfiguration complete message, the false access network device cannot forge the RRC reconfiguration complete message, and therefore can forward the RRC reconfiguration complete message. In this case, because the false access network device forwards the RRC reconfiguration complete message to the genuine access network device, the false access network device can use an identity of the terminal device to access the network. Subsequently, user plane data of both the terminal device and the network may be forwarded by the false access network device. If the user plane data is not protected, the false access network device can perform an advanced attack such as forgery, tampering, or sniffing.

To prevent the terminal device from being handed over to the false access network device, before controlling the terminal device to perform handover, the source access network device controls the terminal device to perform secondary measurement on a specified signal source, where the specified signal source is used to indicate a genuine signal source. In this way, the terminal device may measure a genuine measurement signal and report the genuine measurement signal to the source access network device. After obtaining a correct measurement signal, the source access network device may determine whether to perform handover, and cancel a handover request that does not meet a handover condition.

Figure 3:
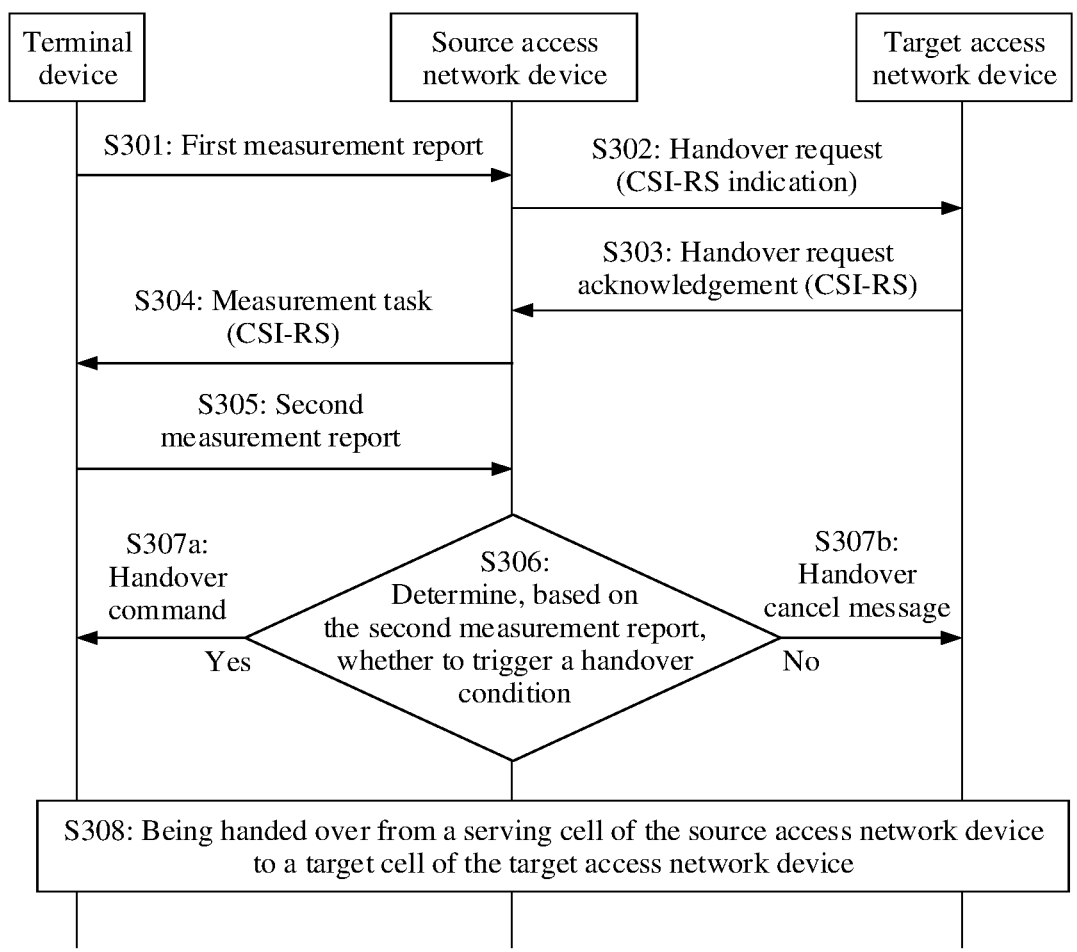
FIG. 3 is a schematic flowchart of performing secondary measurement during cell handover according to an embodiment of this application.

FIG. 3 is a schematic flowchart of performing secondary measurement by a terminal device to prevent the terminal device from being handed over to a false access network device in a handover process.

S301: The terminal device reports a first measurement report to a source access network device. For example, for a manner of reporting the first measurement report, refer to related descriptions in FIG. 2. Details are not described herein again.

S302: When determining, based on the measurement report, to perform handover decision (HO decision), the source access network device initiates a handover request to a target access network device. For example, when determining, based on the measurement report, that signal quality of a target cell reaches a second handover threshold, the source access network device performs handover decision. The handover request includes a channel state information-reference signal (CSI-RS) indication, and the CSI-RS indication is used to request the source access network device to return a CSI-RS to the terminal device. The CSI-RS may be used to assist the terminal device in measuring a specified channel state of the target cell. For example, the CSI-RS is used to indicate the terminal device to measure a signal at a specific location of a sector. Therefore, the source access network device indicates the terminal device to measure a signal at a specified location. When the false access network device and a genuine access network device are located at different locations, the terminal device can measure signal quality of a target cell of the genuine access network device based on the CSI-RS.

S303: After receiving the handover request, the target access network device prepares a context that is of the target cell and that enables successful handover of the terminal device, and sends a handover request acknowledgement to the source access network device, where the handover request acknowledgement carries the CSI-RS.

S304: After receiving the handover request acknowledgement, the source access network device sends a measurement task message to the terminal device, where the measurement task message is used to indicate the terminal device to perform secondary measurement, and the measurement task message carries the CSI-RS.

S305: The terminal device performs secondary measurement on the specified channel state of the target cell indicated by the CSI-RS, and sends a second measurement report of the secondary measurement to the source access network device. For example, the second measurement report may carry signal quality of the target cell obtained through secondary measurement. The secondary measurement is performed based on the channel state of the target cell, so that the signal quality of the target cell of the genuine access network device is measured.

S306: The source access network device determines, based on the second measurement report of the secondary measurement, whether to trigger a handover condition. If determining to trigger the handover condition, the source access network device performs S307*a*; or if determining not to trigger the handover condition, the source access network device performs S307*b*.

The handover condition may include events A3 or A5. For example, when the event A3 indicates that the signal quality of the target cell is higher than signal quality of a current cell, the source access network device determines that the terminal device is to perform handover, and when the event A5 indicates that the signal quality of the current cell is lower than a first handover threshold and the signal quality of the target cell is higher than the first handover threshold, the source access network device determines that the terminal device is to perform handover. The first handover threshold is a threshold used by the terminal device to trigger cell handover.

S307*a*: The source access network device sends a handover command (HO command) to the terminal device, where the handover command is used to indicate the terminal device to perform handover, that is, to perform S308.

S307*b*: The source access network device sends a handover cancel (HO cancel) message to the target access network device, where the handover cancel message is used to indicate the target access network device to cancel performing cell handover on the terminal device.

S308: The terminal device is handed over from a serving cell of the source access network device to a target cell of the target access network device.

It can be learned from the foregoing descriptions that a signal obtained through secondary measurement is a signal of the genuine access network device. Therefore, determining performed based on the signal obtained through secondary measurement can prevent the terminal device from being handed over to the false access network device. However, before performing cell handover, the source access network device needs to perform signaling exchange with the terminal device, to indicate the terminal device to perform secondary measurement based on the CSI-RS. Consequently, a handover delay is increased.

Figure 4:
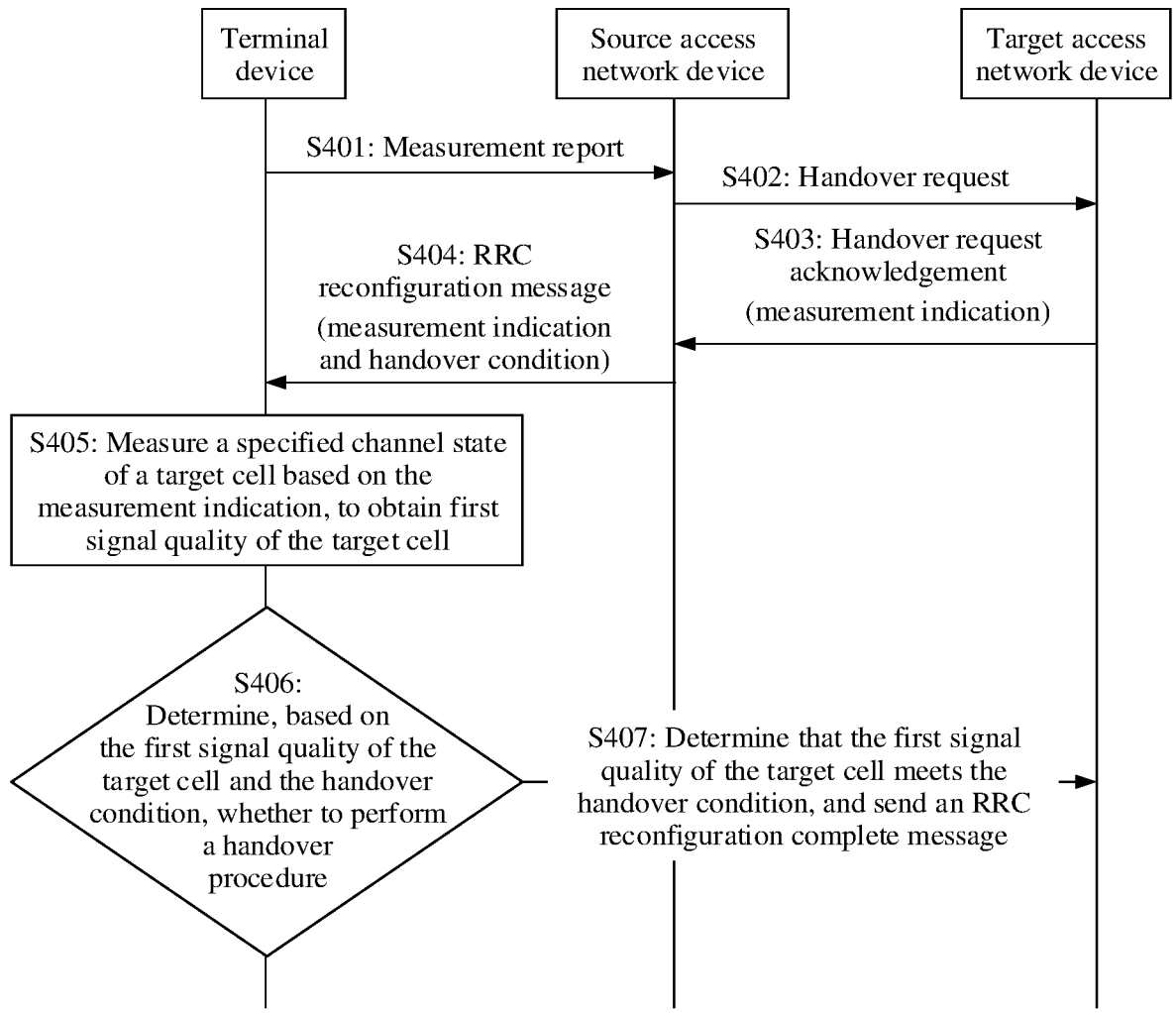
FIG. 4 to FIG. 6 are schematic flowcharts of cell handover according to an embodiment of this application.

To resolve a handover delay problem, an embodiment of this application provides a cell handover method. Refer to FIG. 4. The method may include the following steps.

S401: A terminal device sends a measurement report to a source access network device, where the measurement report includes signal quality of a target cell of a target access network device.

For ease of subsequent description, the signal quality of the target cell included in the measurement report is referred to as second signal quality. When a false access network device exists, the second signal quality included in the measurement report may be signal quality of the false access network device measured by the terminal device when the false access network device forges the target cell of the target access network device.

For example, the measurement report may be reported in the manner described in the embodiment in FIG. 2, for example, by using the first implementation. The measurement report includes only signal quality of the target cell measured by the terminal device last time. For example, the second signal quality included in the measurement report is the signal quality that is measured by the terminal device and that is of the target cell forged by the false access network device. For example, the measurement report may be reported by using the second implementation. The measurement report may include signal quality of the target cell measured by the terminal device for a plurality of times within preset duration. In this case, the measurement report may include the signal quality that is measured by the terminal device and that is of the target cell (forged target cell) forged by the false access network device, and further include the signal quality of the target cell (genuine target cell) of the target access network device. For ease of description, the signal quality of the target cell of the target access network device is referred to as third signal quality. In other words, the measurement report may further include the third signal quality of the target cell in addition to the second signal quality. When the second implementation is used, a distance between the false access network device and the terminal device may be shorter than a distance between the target access network device and the terminal device. Therefore, the second signal quality is higher than the third signal quality.

Optionally, the measurement report may further include signal quality of another neighboring cell of a serving cell of the terminal device. The serving cell belongs to the source access network device. The foregoing target cell may also be considered as a neighboring cell of the serving cell of the terminal device.

S402: The source access network device sends a handover request to the target access network device when determining, based on the measurement report, that the terminal device needs to be handed over to the target cell.

For example, the determining that the terminal device needs to be handed over to the target cell may be determining that the terminal device is to be handed over to the target cell, or may be determining that the terminal device needs to be immediately handed over to the target cell. For example, when determining that the second signal quality reaches a second handover threshold, the source access network device determines that the terminal device needs to be immediately handed over to the target cell. For another example, when determining that the second signal quality does not reach the second handover threshold but reaches a third handover threshold, the source access network device determines that the terminal device is to be handed over to the target cell.

For example, the second handover threshold may be the same as or different from the first handover threshold.

For ease of description, a handover request sent by the source access network device to the target access network device when determining that the terminal device is to be handed over to the target cell is referred to as a conditional handover request (conditional HO request) message, and is used to request to perform cell handover when a handover condition is met. The third handover threshold is a threshold for conditional handover. A handover request sent by the source access network device to the target access network device when determining that the terminal device needs to be handed over to the target cell is referred to as a handover request (HO request) message, and is used to request to perform cell handover.

In a possible implementation, the conditional handover request message and the handover request message may be in a same signaling format. Specifically, whether the message is the conditional handover request message or the handover request message may be indicated based on different values of a specific information element in the message. Alternatively, the conditional handover request message and the handover request message may be in different signaling formats. For example, the conditional handover request message may include a conditional handover information element, and the conditional handover information element is used to indicate that current handover of the target access network device is conditional handover. The handover request message does not carry the conditional handover information element.

S403: The target access network device sends a handover request acknowledgement to the source access network device after receiving the handover request, where the handover request acknowledgement carries a measurement indication, and the measurement indication is used to indicate the terminal device to measure a channel state of the target cell.

S404: The source access network device receives the handover request acknowledgement from the target access network device, and sends an RRC reconfiguration message to the terminal device, where the RRC reconfiguration message carries the measurement indication and the handover condition.

The handover condition is used to indicate a condition that needs to be met when the terminal device performs cell handover. The handover condition may be obtained by the source access network device. A specific obtaining manner is described in detail below. Details are not described herein again. The measurement indication is used to indicate the terminal device to measure the channel state of the target cell.

For example, the measurement indication may include at least one of the following: a synchronization signal block (synchronization signal/physical broadcast channel block, SSB) or a CSI-RS. For example, the RRC reconfiguration message may further include a configuration parameter used to identify the target cell, such as an identifier of the target cell or a frequency of the target cell.

For example, the handover condition may include a first event and/or a second event. For example, the first event may be an event A3, and the second event may be an event A5. The first event may be that the signal quality of the target cell is higher than signal quality of a serving cell on which the terminal device currently camps. The second event is that the signal quality of the serving cell on which the terminal device currently camps is less than the first handover threshold and the signal quality of the target cell is greater than the first handover threshold.

After receiving the RRC reconfiguration message sent by the source network device, the terminal device temporarily does not release a context of the source access network device, that is, continues to maintain a data connection to the source network device, and measures the specified channel state of the target cell based on the measurement indication, for example, performs S405.

S405: The terminal device receives the RRC reconfiguration message sent by the source access network device, and measures the specified channel state of the target cell based on the measurement indication, to obtain first signal quality of the target cell.

S406: The terminal device determines, based on the first signal quality of the target cell and the handover condition, whether to perform a handover procedure.

In a possible example, the terminal device may determine, based on the first signal quality of the target cell and the handover condition in the following manner, whether to perform the handover procedure.

The terminal device determines whether the first signal quality of the target cell meets the handover condition; and if the handover condition is met, the terminal device sends an RRC reconfiguration complete message (a handover acknowledgement message) to the target cell, which is shown as S407 in FIG. 4; or if the handover condition is not met, the terminal device skips performing the handover procedure.

For example, the handover condition is the event A5. The terminal device determines that the first signal quality of the target cell and the signal quality of the serving cell meet the event A5. That is, the first signal quality is greater than the first handover threshold and the signal quality of the serving cell is less than the first handover threshold. In this case, the terminal device prepares to be handed over to the target cell. The terminal device initiates random access to the target cell, to establish a lower-layer link. Then, the terminal device sends the RRC reconfiguration complete message to the target access network device, to complete handover to the target access network device.

For another example, the terminal device determines that the first signal quality of the target cell and the signal quality of the serving cell do not meet the event A5. For example, the first signal quality is less than the first handover threshold and the signal quality of the serving cell is greater than the first handover threshold. In this case, the terminal device is not handed over to the target cell. In this case, the terminal device determines that the signal measured in step S401 is suspected to be a signal of the false access network device, thereby preventing the terminal device from being handed over to the target cell.

For example, if the measurement indication is the CSI-RS, the CSI-RS may be used to indicate the terminal device to measure a signal at a specific location of a sector. Therefore, the source access network device side indicates the terminal device to measure a signal at a specified location. When the false access network device and a genuine access network device are located at different locations, the first signal quality measured by the terminal device based on the measurement indication is signal quality of a target cell of the genuine access network device.

In a possible example, the handover condition may be obtained in the following manners.

First Possible Manner:

The source access network device obtains a handover condition parameter based on local configuration information, where the handover condition parameter is used to generate the handover condition, and the handover condition parameter may include a handover threshold, a handover reference value, and the like.

For example, the handover threshold is used to determine whether handover can be performed, and may be used to generate the event A5. The handover reference value is used to indicate a difference between two measurement signals, and may be used to generate the event A3.

The handover request sent by the source access network device to the target access network device in S402 carries the handover condition parameter. After receiving the handover condition parameter, the target access network device generates the handover condition based on the handover condition parameter, for example, generates the event A3 or the event A5 based on the handover threshold. In addition, the handover request acknowledgement sent by the target access network device to the source access network device in S403 further carries the handover condition. In other words, in the first possible manner, the handover request acknowledgement carries the measurement indication and the handover condition. For example, the handover request acknowledgement may be a first RRC message. When performing S404, the source access network device may carry the first RRC message when sending the RRC reconfiguration message to the terminal device.

Second Possible Manner:

The source access network device obtains a handover condition parameter based on local configuration information, and generates the handover condition based on the handover condition parameter. After the source access network device receives the handover request acknowledgement sent by the target access network device in S404, the source access network device may send the RRC reconfiguration message to the terminal device, and include the handover condition in the RRC reconfiguration message.

Third Possible Manner:

After receiving the handover request in S403, the target access network device may obtain a handover condition parameter based on local configuration information, and includes the handover condition parameter in the handover request acknowledgement when sending the handover request acknowledgement to the source access network device, to jointly send the handover condition parameter and the handover request acknowledgement to the source access network device. Therefore, the source access network device receives the handover condition parameter while receiving the handover request acknowledgement in step S404, and generates the handover condition based on the handover condition parameter. In this way, the source access network device jointly sends the handover condition and the measurement indication to the terminal device by using the RRC reconfiguration message.

Because integrity protection is performed on the RRC reconfiguration message sent by the source access network device to the terminal device, the false access network device cannot tamper with the RRC reconfiguration message. In other words, the false access network device cannot tamper with the measurement indication and the handover condition in the RRC reconfiguration message. Therefore, the measurement indication shall be sent by the genuine access network device. In addition, because the measurement indication is sent by the genuine access network device and is used to indicate the terminal device to measure the specified channel state of the target cell, when the false access network device and the genuine access network device are located at different locations, the terminal device may measure the signal quality of the target cell of the genuine access network device. In addition, because the handover condition received by the terminal device is sent from the genuine access network device, the terminal device can directly determine, based on signal quality of the target cell obtained through secondary measurement (namely, the signal quality of the target cell measured based on the measurement indication) and the handover condition, whether to perform handover. When the signal quality of the target cell obtained through secondary measurement does not meet the handover condition, it indicates that a target cell corresponding to signal quality obtained through first measurement (namely, the signal quality included in the measurement report) is forged by the false access network device. In this case, the terminal device is not handed over to the false access network device. In a handover solution provided in this embodiment of this application, both signal measurement and handover determining are performed by a terminal device side. Therefore, the terminal device does not need to report a secondary measurement result by using signaling, thereby reducing a handover delay of terminal handover caused by the secondary measurement.

Because the false access network device does not exist everywhere, to reduce signaling overheads on a terminal side and a network side and reduce complexity of secondary measurement on the terminal device side, when the terminal side or the network side determines that the false access network device is suspected to exist, a terminal may be triggered to perform secondary measurement. The following is separately described with reference to FIG. 5 and FIG. 6 from a perspective of determining, by the terminal side, that the false access network device is suspected to exist and from a perspective of determining, by the network side, that the false access network device exists.

Refer to FIG. 4. The handover method provided in this embodiment of this application is described in detail from a perspective of determining, by the terminal device, that the false access network device is suspected to exist.

A possible manner in which the terminal device determines that the false access network device is suspected to exist is as follows:

The terminal device measures the signal quality of the target cell (where one may be the signal quality of the target cell forged by the false access network device, and the other one may be the signal quality of the genuine target cell) twice within the preset duration, to obtain the second signal quality and the third signal quality of the target cell. Because the false access network device exists, the false access network device forges the target cell of the target access network device. Consequently, within the preset duration, the terminal device measures the signal quality of the target cell of the genuine access network device, which is referred to as the third signal quality herein, and further measures the signal quality of the target cell forged by the false access network device, which is referred to as the second signal quality herein. When a difference between the second signal quality and the third signal quality is greater than a first threshold, the terminal device determines that the false access network device is suspected to exist. In this scenario, the terminal device may detect whether the false access network device is suspected to exist in a surrounding area. When it is detected in the measurement report that the false access network device is suspected to exist, the terminal device includes, in the measurement report, a first indication used to indicate that the target cell is a suspect cell (that is, the target cell is suspected to be the target cell forged by the false access network device). In this way, the source access network device requests the measurement indication from the target access network device after receiving the first indication.

Figure 5:
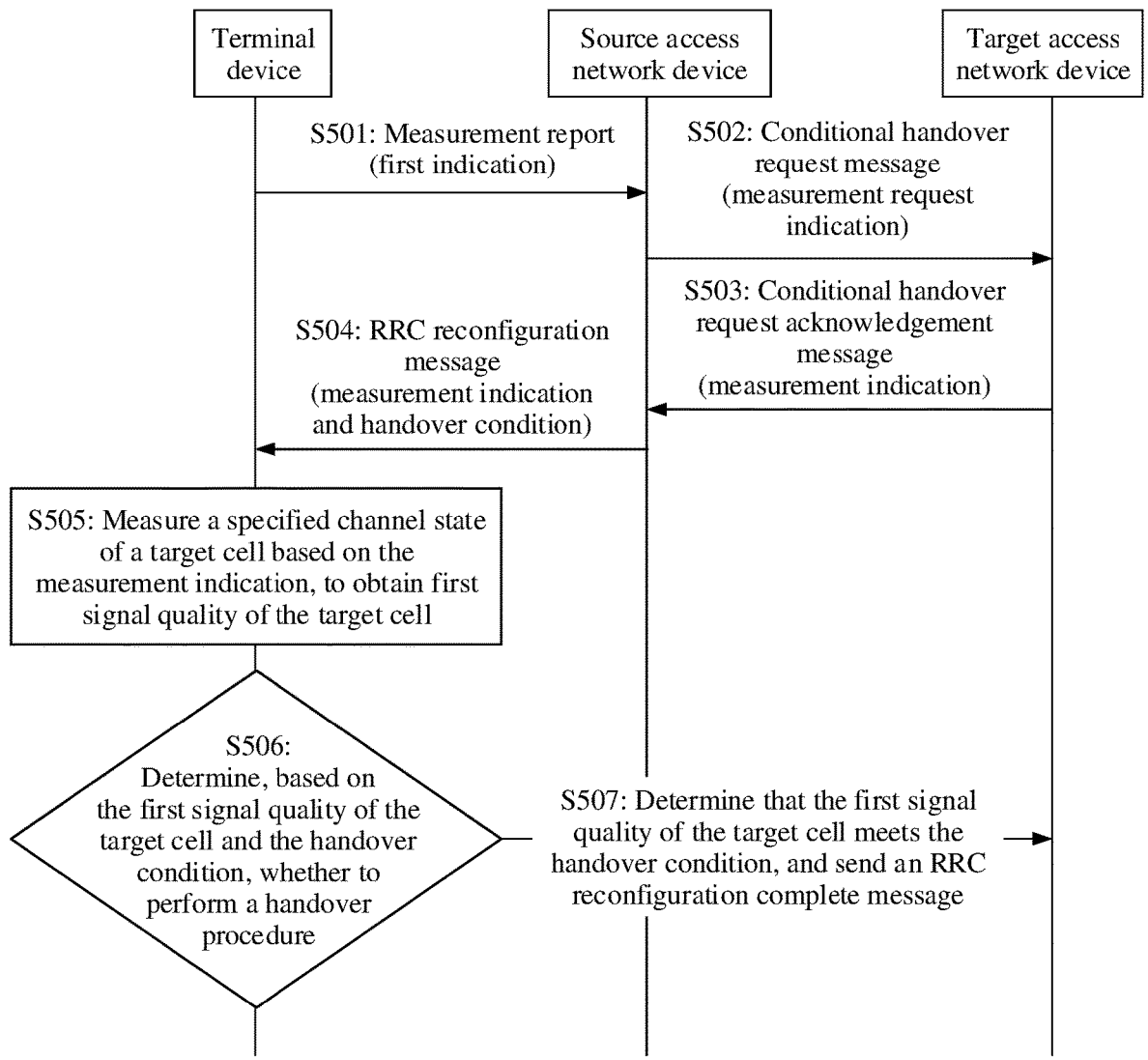

For a specific handover method, refer to FIG. 5. In an embodiment shown in FIG. 5, an example in which a handover request is a conditional handover request message is used for description.

S501: A terminal device reports a measurement report to a source access network device. For a manner of reporting the measurement report, refer to S401. Details are not described herein again. For example, the measurement report may include an identifier of a target cell, signal quality of the target cell, and a first indication. The first indication may also be referred to as a suspect indication, and certainly may have another name. This is not limited in this embodiment of this application.

For example, the identifier of the target cell is target cell ID 1, and the signal quality of the target cell is signal 1. The measurement report may carry target cell ID 1, signal 1, and the first indication. The first indication may be used to indicate that the target cell is suspicious, or may be used to indicate that a difference between measurement signals of the target cell measured for a plurality of times is relatively large, or may be used to indicate that the target cell may be forged. Particularly, the first indication may be used to indicate the source access network device to request a measurement indication from a target access network device.

S502: When the source access network device determines, based on the measurement report, that the terminal is to trigger cell handover, and the measurement report carries the first indication, the source access network device sends the conditional handover request message to the target access network device, where the conditional handover request message carries a measurement request indication, and the measurement request indication is used to request the measurement indication from the target access network device.

That the source access network device determines, based on the measurement report, that the terminal device is to trigger cell handover includes: The source access network device determines that the signal quality of the target cell carried in the measurement report is greater than a handover threshold (second handover threshold) for conditional handover.

S503: After receiving the conditional handover request message, the target access network device may prepare a context that enables cell handover of the terminal device, prepare the measurement indication based on the measurement request indication, and send a conditional handover request acknowledgement (conditional HO request ACK) message to the source access network device, where the conditional handover request acknowledgement message carries the measurement indication and handover configuration information, and the conditional handover request acknowledgement message is a response message corresponding to the conditional handover request message.

For S504 to S507, refer to S404 to S407. Details are not described herein again. For a manner of obtaining a handover condition, refer to the descriptions in the embodiment in FIG. 4. Details are not described herein again.

In an example, the terminal device does not measure a signal from a same cell twice or more times within preset duration. In this case, the measurement report reported by the terminal device to the source access network device does not need to carry the first indication.

In another example, a difference between signal quality of a same cell measured by the terminal device at least twice within preset duration is less than or equal to a first threshold. In this case, the measurement report reported by the terminal device to the source access network device does not need to carry the first indication.

For example, when the source access network device determines, based on the measurement report, that second signal quality of the target cell is greater than a handover threshold for conditional handover, and the measurement report does not carry the first indication, the source access network device sends the conditional handover request message to the target access network device, where the conditional handover request message does not carry a measurement request indication. After receiving the conditional handover request message, the target access network device prepares a context that enables cell handover of the terminal device, and sends a conditional handover request acknowledgement message to the source access network device, where the conditional handover request acknowledgement message does not need to carry a measurement indication. After receiving the conditional handover request acknowledgement message sent by the target access network device, the source access network device measures a signal of the target cell (that is, does not need to measure a specified channel state of the target cell), to obtain a measurement result. The terminal device performs a cell handover procedure when determining that the measurement result meets a handover condition.

In the foregoing manner, the terminal device reports the first indication to the source access network device when determining that a false access network device is suspected to exist, to indicate the source access network device to request, from the target access network device, the measurement indication for secondary measurement. When determining that the false access network device does not exist, the terminal device does not need to report the first indication to the source access network device. Therefore, the terminal device does not need to perform secondary measurement. This can reduce complexity of secondary measurement on a terminal device side, and reduce signaling overheads of the terminal device and a network side.

Figure 6:
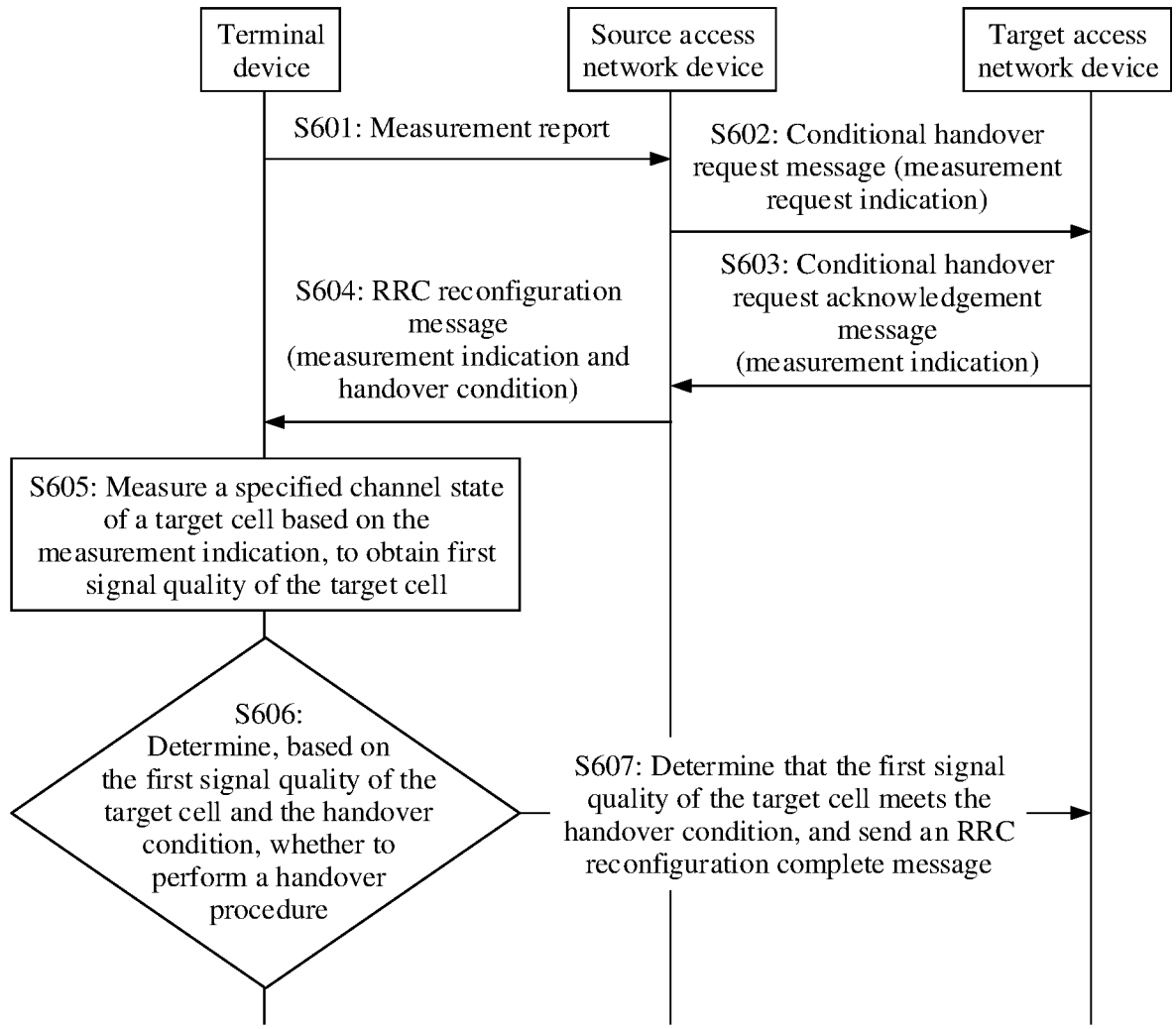

Refer to FIG. 6. The handover method provided in this embodiment of this application is described in detail from a perspective of determining, by the source access network device, that the false access network device is suspected to exist. In FIG. 6, conditional handover is used as an example.

S601: A terminal device reports a measurement report to a source access network device. For a manner of reporting the measurement report, refer to S401. Details are not described herein again.

S602: When determining that a false access network device is suspected to exist, and determining, based on the measurement report, that signal quality of a target cell is greater than a handover threshold for conditional handover, the source access network device sends a conditional handover request message to a target access network device, where the conditional handover request message carries a measurement request indication, and the measurement request indication is used to request a measurement indication.

Optionally, if unconditional handover is used, when determining that the false access network device is suspected to exist, the source access network device determines, based on the measurement report, that second signal quality of the target cell reaches a handover threshold (first handover threshold) for unconditional handover. In this case, the source access network device sends a handover request message to the target access network device.

An example of a manner in which the source access network device determines that the false access network device is suspected to exist is as follows:

For the measurement report, the second implementation described in the embodiment shown in FIG. 2 may be used. The measurement report includes signal quality of a same target cell measured by the terminal device twice within preset duration, and the signal quality of the same target cell measured twice is respectively the second signal quality and third signal quality. The source access network device receives the measurement report sent by the terminal device. Then, when determining that a difference between the signal quality of the same target cell measured twice (namely, a difference between the second signal quality and the third signal quality) is greater than a first threshold, the source access network device determines that the false access network device is suspected to exist.

Another example of the manner in which the source access network device determines that the false access network device is suspected to exist is as follows:

For the measurement report, the first or second implementation described in the embodiment shown in FIG. 2 may be used. The terminal device further reports auxiliary detection information in the measurement report. For example, the auxiliary detection information may be a hash (HASH) value of a broadcast packet of a current serving cell or a neighboring cell of the serving cell, a quantity of times of rejection, or signal quality statistics. The source access network device determines, based on the auxiliary detection information, that the false access network device is suspected to exist.

The hash value of the broadcast packet is a hash value calculated by the terminal device based on the broadcast packet of the current serving cell or the neighboring cell. For example, the false access network device may have a unique broadcast packet. In this case, if the terminal device reports a hash value of a broadcast packet of the false access network device to the source access network device, the source access network device may determine, based on the hash value of the broadcast packet of the current cell or the neighboring cell, whether the hash value of the broadcast packet of the current cell or the neighboring cell is the same as the hash value sent by the terminal device. If determining that the hash value of the broadcast packet of the current cell or the neighboring cell is different from the hash value sent by the terminal device, the source access network device may determine that the hash value of the broadcast packet is not a hash value broadcast by a genuine access network device. In this way, the source access network device may determine that the false access network device exists, and further determine, based on an identifier of a cell to which the hash value of the broadcast packet belongs, a cell forged by the false access network device.

The quantity of times of rejection is used by the terminal device to record a quantity of times that access is rejected by the current serving cell and/or the neighboring cell. For example, due to the false access network device, the terminal device may be repeatedly rejected by a network side. Consequently, a quantity of times that the terminal device is rejected is greater than an average quantity of times. The source access network device may determine, based on the quantity of times that the terminal device is rejected, that the false access network device may exist, and further determine, based on an identifier of a cell whose quantity of times of rejection is greater than the average quantity of times, the cell forged by the false access network device.

The signal quality statistics is used by the terminal device to record signal quality statistics of the current serving cell or the neighboring cell. For example, the false access network device may interfere with a signal of the current serving cell or the neighboring cell currently accessed by the terminal device. The source access network device may determine, based on a change status of the signal quality statistics, that the false access network device exists, and further determine, based on an identifier of the current serving cell or the neighboring cell, a cell forged by a false base station.

Based on the foregoing detection, if the source access network device determines, based on the auxiliary detection information, that some cells may be forged by the false access network device, the source access network device may further send the measurement request indication to the target cell when determining, based on a cell identifier in the measurement report, that the target cell to be handed over is forged.

S603: After receiving the conditional handover request message, the target access network device prepares a context that enables cell handover of the terminal device, prepares the measurement indication based on the measurement request indication, and sends a conditional handover request acknowledgement message to the source access network device, where the conditional handover request acknowledgement message carries the measurement indication.

For S604 to S606, refer to S404 to S407. Details are not described herein again. For a manner of obtaining a handover condition, refer to the descriptions in the embodiment in FIG. 4. Details are not described herein again.

For example, when the source access network device does not determine that the false access network device is suspected to exist, for example, determines, based on the measurement report, that a difference between signal quality of a same target cell measured by the terminal device twice is less than or equal to a first threshold, the conditional handover request message sent by the source access network device to the target access network device does not carry the measurement request indication. After receiving the conditional handover request message, the target access network device sends a conditional handover request acknowledgement message to the source access network device, where the conditional handover request acknowledgement message does not need to carry a measurement indication. After receiving the conditional handover request acknowledgement message sent by the target access network device, the source access network device measures a signal of the target cell (that is, does not need to measure a specified signal of the target cell), to obtain a measurement result. The terminal device performs a cell handover procedure when determining that the measurement result meets a handover condition.

Figure 7:
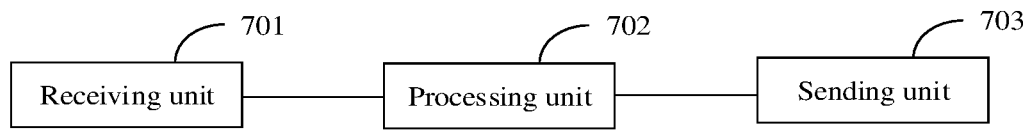
FIG. 7 is a schematic diagram of a structure of a communication apparatus 700 according to an embodiment of this application.

Based on a same inventive concept as the method embodiments, an embodiment of this application further provides a communication apparatus. The apparatus is configured to perform the methods performed by the terminal device in the method embodiments shown in FIG. 4 to FIG. 6. For a related feature, refer to the foregoing method embodiments. Details are not described herein again. In an example, as shown in FIG. 7, the apparatus includes a receiving unit 701, a processing unit 702, and a sending unit 703.

The receiving unit 701 is configured to receive a radio resource control (RRC) reconfiguration message sent by a source access network device, where the RRC reconfiguration message carries a measurement indication and a handover condition.

The processing unit 702 is configured to: measure a specified channel state of a target cell based on the measurement indication, to obtain first signal quality of the target cell; and determine, based on the first signal quality of the target cell and the handover condition, whether to perform a handover procedure.

In a possible design, the processing unit 702 is configured to determine whether the first signal quality of the target cell meets the handover condition. If the handover condition is met, the sending unit 703 is configured to send an RRC reconfiguration complete message to the target cell; or if the handover condition is not met, the processing unit 702 skips performing the handover procedure.

In a possible design, the sending unit 703 is further configured to: before the receiving unit 701 receives the RRC reconfiguration message sent by the source access network device, send a measurement report to the source access network device, where the measurement report includes second signal quality of the target cell obtained through measurement performed by the processing unit 702 on the target cell.

In a possible design, the processing unit 702 is further configured to: determine whether a false access network device is suspected to exist; and when determining that the false access network device is suspected to exist, include the first indication in the measurement report, where the first indication is used to indicate, to the source access network device, that the target cell is suspicious.

In a possible design, the processing unit 702 is further configured to measure the target cell, to obtain the second signal quality and third signal quality of the target cell; and is specifically configured to: when a difference between the second signal quality and the third signal quality is greater than a first threshold, determine that the false access network device is suspected to exist.

In a possible design, the measurement indication includes one or both of the following information: a synchronization signal block (SSB) or a channel state information-reference signal (CSI-RS).

In a possible design, the handover condition includes a first event or a second event, where the first event is that signal quality of the target cell is higher than signal quality of a serving cell on which the terminal device currently camps; and the second event is that the signal quality of the serving cell on which the terminal device currently camps is less than a handover threshold and the signal quality of the target cell is greater than the handover threshold.

Figure 8:
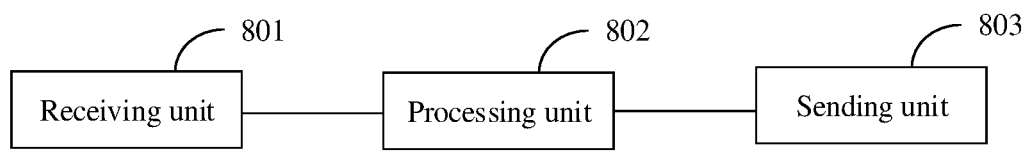
FIG. 8 is a schematic diagram of a structure of a communication apparatus 800 according to an embodiment of this application.

Based on a same inventive concept as the method embodiments, an embodiment of this application further provides a communication apparatus. The apparatus is used in a source access network device and is configured to perform the methods performed by the source access network device in the method embodiments shown in FIG. 4 to FIG. 6. For a related feature, refer to the foregoing method embodiments. Details are not described herein again. In an example, as shown in FIG. 8, the apparatus includes a receiving unit 801, a processing unit 802, and a sending unit 803.

The receiving unit 801 is configured to receive a measurement report sent by a terminal device, where the measurement report includes second signal quality of a target cell of a target access network device.

The processing unit 802 is configured to determine, based on the second signal quality of the target cell, that the terminal device needs to be handed over to the target cell.

The sending unit 803 is configured to send a handover request to the target access network device when determining, based on the second signal quality of the target cell, that the terminal device needs to be handed over to the target cell.

The receiving unit 801 is further configured to receive a handover request acknowledgement from the target access network device, where the handover request acknowledgement includes a measurement indication, and the measurement indication is used to indicate the terminal device to measure a channel state of the target cell.

The sending unit 803 is further configured to send a radio resource control (RRC) reconfiguration message to the terminal device, where the RRC reconfiguration message carries the measurement indication and a handover condition, and the handover condition is obtained by the source access network device and is used to indicate a condition that needs to be met when the terminal device performs cell handover.

In a possible design, the handover request carries a measurement request indication, and the measurement request indication is used to request the measurement indication from the target access network device.

In a possible design, the processing unit 802 is further configured to: determine whether a false access network device is suspected to exist; and include the measurement request indication in the handover request when determining that a false access network device is suspected to exist.

In a possible design, the measurement report includes the second signal quality of the target cell and third signal quality of the target cell that are measured within preset duration. When determining that the false access network device is suspected to exist, the processing unit 802 is specifically configured to: when a difference between the second signal quality of the target cell and the third signal quality of the target cell is greater than a first threshold, determine that the false access network device is suspected to exist.

In a possible design, the measurement report further carries a first indication, and the first indication is used to indicate that the target cell is suspicious. The processing unit 802 is further configured to include the measurement request indication in the handover request based on the first indication.

In a possible design, the processing unit 802 is further configured to: before the sending unit 803 sends the RRC reconfiguration message to the terminal device, generate the handover condition based on a handover condition parameter, where the handover condition parameter is a parameter in local configuration information of the source access network device, or the handover condition parameter is sent by the target access network device.

In a possible design, the handover request carries a handover condition parameter in local configuration information of the source access network device, and the handover condition parameter is used to generate the handover condition. The handover request acknowledgement further carries the handover condition.

In a possible design, the measurement indication includes one or both of the following information: an SSB or a CSI-RS.

In a possible design, the handover condition includes a first event or a second event, where the first event is that signal quality of the target cell is higher than signal quality of a serving cell on which the terminal device currently camps; and the second event is that the signal quality of the serving cell on which the terminal device currently camps is less than a first handover threshold and the signal quality of the target cell is greater than the first handover threshold.

In a possible design, when determining, based on the second signal quality of the target cell, that the terminal device needs to be handed over to the target cell, the processing unit 802 is specifically configured to: determine that the second signal quality of the target cell is greater than a second handover threshold, or determine that the second signal quality of the target cell is less than the second handover threshold but greater than a third handover threshold.

In the embodiments of this application, division into the units is an example and is merely logical function division, and may be other division during actual implementation. In addition, functional units in the embodiments of this application may be integrated into one processor, may exist alone physically, or two or more units may be integrated into one module. The foregoing integrated unit may be implemented in a form of hardware, or may be implemented in a form of a software functional module.

When the integrated unit is implemented in a form of a software functional unit and sold or used as an independent product, the integrated unit may be stored in a computer-readable storage medium. Based on such an understanding, the technical solutions of this application essentially, or the part contributing to a conventional technology, or all or some of the technical solutions may be implemented in a form of a software product. The computer software product is stored in a storage medium and includes several instructions for instructing a terminal device (which may be a personal computer, a mobile phone, a network device, or the like) or a processor to perform all or some of the steps of the method in the embodiments of this application. The foregoing storage medium includes: any medium that can store program code, such as a USB flash drive, a removable hard disk, a read-only memory (ROM), a random access memory (RAM), a magnetic disk, or an optical disc.

In the embodiments of this application, both the terminal device and the source access network device may be presented in a form of functional modules obtained through division in an integrated manner. The "module" herein may be an application-specific integrated circuit (ASIC), a circuit, a processor executing one or more software or firmware programs, a memory, an integrated logic circuit, and/or another device that can provide the foregoing function.

Figure 9:
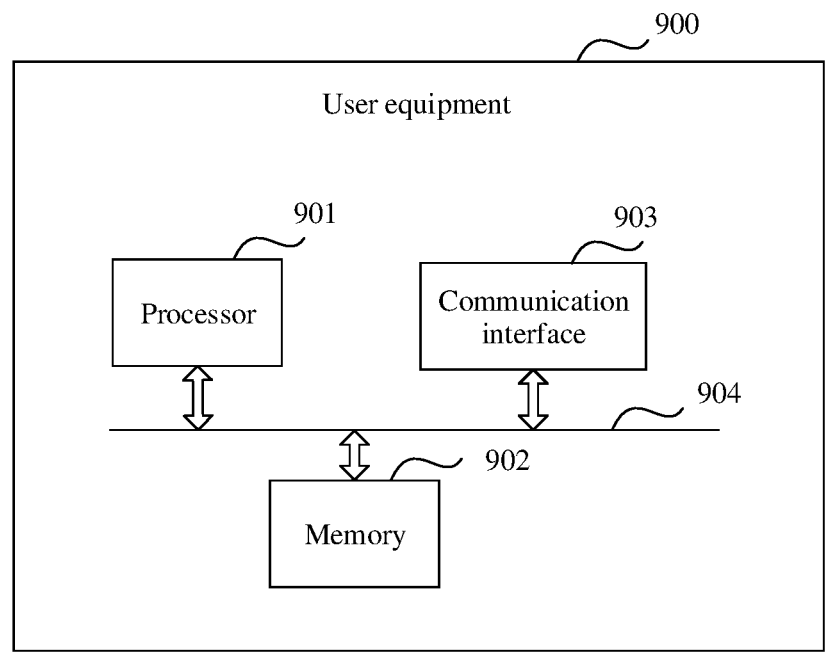
FIG. 9 is a schematic diagram of a structure of a communication apparatus 900 according to an embodiment of this application.

In a simple embodiment, the communication apparatus 900 shown in FIG. 9 includes at least one processor 901 and a memory 902, and optionally, may further include a communication interface 903.

The memory 902 may be a volatile memory such as a random access memory. Alternatively, the memory may be a non-volatile memory such as a read-only memory, a flash memory, a hard disk drive (HDD), or a solid-state drive (SSD). Alternatively, the memory 902 is any other medium that can be configured to carry or store expected program code in a form of instructions or a data structure and that can be accessed by a computer. However, the memory 902 is not limited thereto. The memory 902 may be a combination of the memories.

In this embodiment of this application, a specific connection medium between the processor 901 and the memory 902 is not limited. In this embodiment of this application, the memory 902 is connected to the processor 901 through a bus 904 in the figure. The bus 904 is represented by a thick line in the figure. A connection manner between other components is schematically described, and is not limited thereto. The bus 904 may be classified into an address bus, a data bus, a control bus, and the like. For ease of representation, only one thick line is used to represent the bus in FIG. 9, but this does not mean that there is only one bus or only one type of bus.

The processor 901 may have a data transceiver function, and can communicate with another device. In the apparatus shown in FIG. 9, an independent data transceiver module, for example, the communication interface 903, may also be disposed and is configured to receive and send data. When communicating with the another device, the processor 901 may transmit data through the communication interface 903.

In an example, when the terminal device is in the form shown in FIG. 9, the processor 901 in FIG. 9 may invoke computer-executable instructions stored in the memory 902, to enable the communication apparatus 900 to perform the method performed by the terminal device in any one of the foregoing method embodiments.

Specifically, functions/implementation processes of the sending unit, the receiving unit, and the processing unit in FIG. 7 may be implemented by the processor 901 in FIG. 9 by invoking the computer-executable instructions stored in the memory 902. Alternatively, functions/implementation processes of the processing unit in FIG. 7 may be implemented by the processor 901 in FIG. 9 by invoking the computer-executable instruction stored in the memory 902, and functions/implementation processes of the sending unit and the receiving unit in FIG. 7 may be implemented through the communication interface 903 in FIG. 9.

In another example, when the source access network device is in the form shown in FIG. 9, the processor 901 in FIG. 9 may invoke computer-executable instructions stored in the memory 902, to enable the communication apparatus 900 to perform the method performed by the source access network device in any one of the foregoing method embodiments.

Specifically, functions/implementation processes of the sending unit, the receiving unit, and the processing unit in FIG. 8 may be implemented by the processor 901 in FIG. 9 by invoking the computer-executable instructions stored in the memory 902. Alternatively, functions/implementation processes of the processing unit in FIG. 8 may be implemented by the processor 901 in FIG. 9 by invoking the computer-executable instruction stored in the memory 902, and functions/implementation processes of the sending unit and the receiving unit in FIG. 8 may be implemented through the communication interface 903 in FIG. 9.

Based on a same inventive concept as the method embodiments, an embodiment of this application further provides a communication system. The communication system may include a source access network device and a target access network device, configured to perform the methods performed by the source access network device and the target access network device in any one of the foregoing embodiments. For a related feature, refer to the foregoing method embodiments. Details are not described herein again. In a possible design, the communication system may further include a terminal device, configured to perform the method performed by the terminal device in any one of the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

The computer program instructions may alternatively be loaded onto a computer or another programmable data processing device, so that a series of operations and steps are performed on the computer or another programmable device, thereby generating computer-implemented processing. Therefore, the instructions executed on the computer or the another programmable device provide steps for implementing a specified function in one or more processes in the flowcharts and/or in one or more blocks in the block diagrams.

It is clearly that a person skilled in the art can make various modifications and variations to this application without departing from the scope of this application. In this way, if these modifications and variations to this application fall within the scope of the claims of this application and their equivalent technologies, this application is also intended to cover these modifications and variations.

What is claimed is:

1. A method comprising:
    sending, by an apparatus, a measurement report to a source access network device, wherein the measurement report comprises a second signal quality of a target cell obtained through measurement performed by the apparatus on the target cell, and further comprises a first indication indicating that the target cell is suspicious;

receiving, by the apparatus, a radio resource control (RRC) reconfiguration message from the source access network device, wherein the RRC reconfiguration message carries a measurement indication and a handover condition, the measurement indication indicating the apparatus to measure a channel state of the target cell;

measuring, by the apparatus, the channel state of the target cell based on the measurement indication, to obtain a first signal quality of the target cell; and determining, by the apparatus based on the first signal quality of the target cell and the handover condition, whether to perform a handover procedure to handover to the target cell.

2. The method according to claim 1, wherein the determining, by the apparatus based on the first signal quality of the target cell and the handover condition, whether to perform the handover procedure comprises:

determining, by the apparatus, whether the first signal quality of the target cell meets the handover condition; and when determining that the handover condition is met, sending, by the apparatus, an RRC reconfiguration complete message to the target cell.

3. The method according to claim 1, wherein the method further comprises:

measuring, by the apparatus, the target cell, to obtain the second signal quality and third signal quality of the target cell; and when a difference between the second signal quality and the third signal quality is greater than a first threshold, determining, by the apparatus, that a false access network device exists.

4. The method according to claim 1, wherein the measurement indication comprises a synchronization signal block (SSB).

5. The method according to claim 1, wherein the handover condition comprises a first event or a second event, wherein the first event is that signal quality of the target cell is higher than signal quality of a serving cell on which the apparatus currently camps; and the second event is that the signal quality of the serving cell on which the apparatus currently camps is less than a handover threshold and the signal quality of the target cell is greater than the handover threshold.

6. The method according to claim 1, wherein the determining, by the apparatus based on the first signal quality of the target cell and the handover condition, whether to perform the handover procedure further comprises:

when determining that the handover condition is not met, skipping performing, by the apparatus, the handover procedure.

7. The method according to claim 1, wherein the measurement indication comprises a channel state information-reference signal (CSI-RS).

8. A communication system, comprising a source access network device and a target access network device, wherein the source access network device is configured to: receive a measurement report from a terminal device, wherein the measurement report comprises a second signal quality of a target cell of the target access network device, and further comprises a first indication indicating that the target cell is suspicious; and send a handover request to the target access network device when determining, based on the second signal quality of the target cell, to hand over the terminal device to the target cell;

the target access network device is configured to: receive the handover request from the source access network device, and send a handover request acknowledgement to the source access network device, wherein the handover request acknowledgement comprises a measurement indication, and the measurement indication indicates the terminal device to measure a channel state of the target cell; and the source access network device is further configured to: receive the handover request acknowledgement from the target access network device, and send a radio resource control (RRC) reconfiguration message to the terminal device, wherein the RRC reconfiguration message carries the measurement indication and a handover condition, and the handover condition indicates a condition to be met for the terminal device to perform cell handover.

9. The system according to claim 8, wherein the handover request carries a measurement request indication, and the measurement request indication requests the measurement indication from the target access network device.

10. The system according to claim 9, wherein the source access network device is further configured to comprise the measurement request indication in the handover request when determining that a false access network device is suspected to exist.

11. The system according to claim 10, wherein the measurement report further comprises a third signal quality of the target cell, and the second signal quality of the target cell and the third signal quality of the target cell are measured within a preset duration; and the source access network device is further configured to: when a difference between the second signal quality of the target cell and the third signal quality of the target cell is greater than a first threshold, determine that the false access network device exists.

12. The system according to claim 8, wherein the handover condition comprises a first event or a second event, wherein the first event is that signal quality of the target cell is higher than signal quality of a serving cell on which the terminal device currently camps; and the second event is that the signal quality of the serving cell on which the terminal device currently camps is less than a first handover threshold and the signal quality of the target cell is greater than the first handover threshold.

13. The system according to claim 8, wherein the source access network device is further configured to send the handover request to the target access network device when determining that the second signal quality of the target cell is greater than a handover threshold for triggering sending of the handover request, or when determining that the second signal quality of the target cell is greater than a handover threshold for triggering a conditional handover request.

14. An apparatus comprising:

at least one processor; and a non-transitory memory coupled to the at least one processor and having program instructions stored thereon, which, when executed by the at least one processor, cause the apparatus to:

send a measurement report to a source access network device, wherein the measurement report comprises a second signal quality of a target cell obtained through measurement performed on the target cell, and further comprises a first indication indicating that the target cell is suspicious;

receive a radio resource control (RRC) reconfiguration message from the source access network device, wherein the RRC reconfiguration message carries a measurement indication and a handover condition, the measurement indication indicating to measure a channel state of the target cell;

measure the channel state of the target cell based on the measurement indication, to obtain a first signal quality of the target cell; and determine, based on the first signal quality of the target cell and the handover condition, whether to perform a handover procedure to handover to the target cell.

15. The apparatus according to claim 14, wherein the program instructions further cause the apparatus to:

determine whether the first signal quality of the target cell meets the handover condition; and when determining that the handover condition is met, send an RRC reconfiguration complete message to the target cell.

16. The apparatus according to claim 15, wherein the program instructions further cause the apparatus to:

measure the target cell to obtain the second signal quality and third signal quality of the target cell; and when a difference between the second signal quality and the third signal quality is greater than a first threshold, determine that a false access network device exists.

17. The apparatus according to claim 14, wherein the measurement indication comprises:

a synchronization signal block (SSB).

18. The apparatus according to claim 14, wherein the handover condition comprises a first event or a second event, wherein the first event is that signal quality of the target cell is higher than signal quality of a serving cell on which the apparatus currently camps; and the second event is that the signal quality of the serving cell on which the apparatus currently camps is less than a handover threshold and the signal quality of the target cell is greater than the handover threshold.

19. The apparatus according to claim 14, wherein the program instructions further cause the apparatus to:

when determining that the handover condition is not met, skip performing the handover procedure.

20. The apparatus according to claim 14, wherein the measurement indication comprises a channel state information-reference signal (CSI-RS).

* * * * *